United States Patent [19]
Rollinson

[11] Patent Number: 5,078,454
[45] Date of Patent: Jan. 7, 1992

[54] WHEEL OR ENDLESS TRACK

[75] Inventor: Phillip J. Rollinson, West Perth, Australia

[73] Assignee: Altrack Limited, Australia

[21] Appl. No.: 380,909

[22] Filed: Jul. 17, 1989

[30] Foreign Application Priority Data

Jul. 19, 1988 [AU] Australia ............... PI9369
Sep. 16, 1988 [AU] Australia ............... PJ0444

[51] Int. Cl.⁵ ..................... B60C 7/08; B60C 7/10
[52] U.S. Cl. ..................... 301/44 R; 152/309; 305/54; 305/19
[58] Field of Search ........... 301/5 R, 41 R, 43, 44 R, 301/44 T, 44 A, 44 B; 305/7, 19, 51, 54; 404/121, 122, 124; 152/300, 306, 308, 309

[56] References Cited

U.S. PATENT DOCUMENTS

| | | | |
|---|---|---|---|
| 1,421,029 | 6/1922 | Roe | 152/309 |
| 1,553,018 | 9/1925 | Barth | 152/309 X |
| 4,385,652 | 5/1983 | Frank | 305/55 X |

FOREIGN PATENT DOCUMENTS

| | | | |
|---|---|---|---|
| 461247 | 1/1913 | France | 152/309 |
| 207632 | 12/1923 | United Kingdom . | |
| 565646 | 11/1944 | United Kingdom | 301/43 |
| 857439 | 12/1960 | United Kingdom . | |
| 1416602 | 12/1975 | United Kingdom . | |

*Primary Examiner*—Russell D. Stormer
*Attorney, Agent, or Firm*—Handal & Morofsky

[57] ABSTRACT

A ground engaging apparatus in the form of a wheel for a vehicle, comprising a rim (11) and a plurality of ground engaging elements (13) mounted on the rim. Each ground engaging element (13) comprises a hollow body (31) having an inner face (32) in engagement against the rim and an outer face (33) for contacting the ground. The hollow body (31) also has side faces (34) extending between the inner and outer faces. The side faces (34) are constructed to be resiliently flexible for deflection under normal load conditions thereby to provide cushioning for the vehicle. The ground engaging elements are so positioned on the rim that confronting side faces of neighboring elements provide lateral support for each other when deflecting under load.

18 Claims, 4 Drawing Sheets

WHEEL OR ENDLESS TRACK

FIELD OF THE INVENTION

This invention relates to a ground engaging means for vehicles and is particularly suitable as a wheel or endless track for work vehicles such as earthworking machines, agricultural machines, military vehicles, and vehicles used in rough terrain.

BACKGROUND OF THE INVENTION

Wheels or endless tracks which are resilient in character have certain performance benefits and in particular they provide cushioning so as to offer some resistance to vibration and jarring. While pneumatic tires provide cushioning, they do have the disadvantage of being susceptible to puncturing.

There have been various proposals to provide wheels or endless tracks which can resiliently flex to provide cushioning but which are not pneumatic. One such proposal is disclosed in United Kingdom Patent No. 857439 which is directed to a vehicle ground engaging means in the form of a wheel having a plurality of pieces of flexible tubing circumferentially spaced around its periphery and extending crosswise of the direction of travel. Although the provision of the flexible tubing is intended to provide the wheel with some cushioning characteristics, it is believed that tubing would not perform altogether satisfactorily in practice. This is because the side wall strength required of the tubing to avoid collapsing or excessive deformation under normal load conditions would be such that the tubing would in all probability not flex sufficiently to provide satisfactory cushioning.

SUMMARY OF THE INVENTION

The present invention seeks to provide a ground engaging means for vehicles which is not pneumatic but which can flex resiliently under load to provide some cushioning.

In one form the invention resides in a ground engaging means for a vehicle comprising a base and a plurality of ground engaging elements mounted on the base, each ground engaging element comprising a hollow body having an inner face in engagement against the base, an outer face for contacting the ground, and side faces extending between the inner and outer faces, the side faces being constructed to be resiliently flexible thereby to deflect under normal load conditions, the ground engaging elements being so positioned on the base that confronting side faces of neighboring elements provide lateral support for each other when deflecting under load.

Preferably, neighboring ground engaging elements are positioned in abutting relationship.

In the case of a wheel, said base may be of any suitable form such as the rim of the wheel or a band adapted to be permanently or removably fitted onto the rim.

In the case of an endless track, said base may comprise a flexible endless band passing around end rollers of the track.

Preferably, the ground engaging elements are removably mounted on said base. This allows individual elements to be removed and replaced in the event of damage.

Preferably the ground engaging elements are elongated.

Preferably at least some of the side faces of the ground engaging element are of angular construction comprising inner and outer portions which are integral with each other and which meet at a longitudinal junction.

Preferably, when the ground engaging elements are mounted on the base, the inner portions of confronting side faces of neighboring elements abut each other thereby to provide said lateral support.

Preferably, said outer portions of the side faces of each element are inclined inwardly to provide a lug at the outer region of the ground engaging element to facilitate traction in soft ground conditions.

In one arrangement, each ground engaging element extends transversely of the direction of travel of the wheel or endless track and is preferably configured into a V formation so that the elements create a chevron pattern when mounted on said base.

Preferably, the outer face of each ground engaging element is provided with a tread formation.

Cooling fins may be accommodated within the hollow region of the body if desired.

While each element may be attached to said base in any suitable way, a particularly convenient form of attachment is by way of a clamping plate received within the hollow portion of the body and fixed to the base by one or more bolts which extend through the clamping plate and the inner part of the ground engaging element for connection to the base.

In one preferred form of construction, the hollow body is tubular and open at its ends.

In another form the invention resides in a ground engaging element constructed as set forth in any one or more of the preceding paragraphs.

In still another form the invention resides in a ground engaging means for a vehicle comprising base and a plurality of ground engaging elements mountable to said base, each ground engaging element comprising a hollow body and having an inner face for engagement against the base, an outer face for engagement with the ground and a plurality of side faces extending between the inner face and outer face, said side faces being constructed to be resiliently flexible for deflection under normal load conditions, the ground engaging elements being configured and positioned on the base such that side walls of each ground engaging element provide lateral support to side walls of at least four adjacent ground engaging elements.

Preferably there are five of said side faces comprising a first face, second and third faces extending in the same direction from opposite ends of the first face, and fourth and fifth faces extending from the ends of the second and third faces respectively remote from the first face, said fourth and fifth faces converging to an apex portion, wherein said first face of each ground engaging element is disposed adjacent a peripheral edge of the base and said apex portion is positioned approximately centrally on the base, the second and third faces of each ground engaging element being adjacent to corresponding faces of adjacent ground engaging elements and the fourth and fifth faces of each ground engaging element being adjacent to corresponding faces of oppositely disposed ground engaging elements.

Preferably at least some of the side faces of the ground engaging elements are provided with chamfers or grooves whereby upon assembly of the ground engaging elements on the base the chamfers or grooves define a tread pattern.

Preferably the interior of the hollow body opens onto the first face.

In another form the invention resides in a ground engaging element constructed as set forth at any one or more of the immediately preceding four paragraphs.

BRIEF DESCRIPTION OF THE DRAWINGS

The invention will be better understood by reference to the following description of two specific embodiments thereof as shown in the accompanying drawings in which.

DESCRIPTION OF PREFERRED EMBODIMENTS

Figure 1:
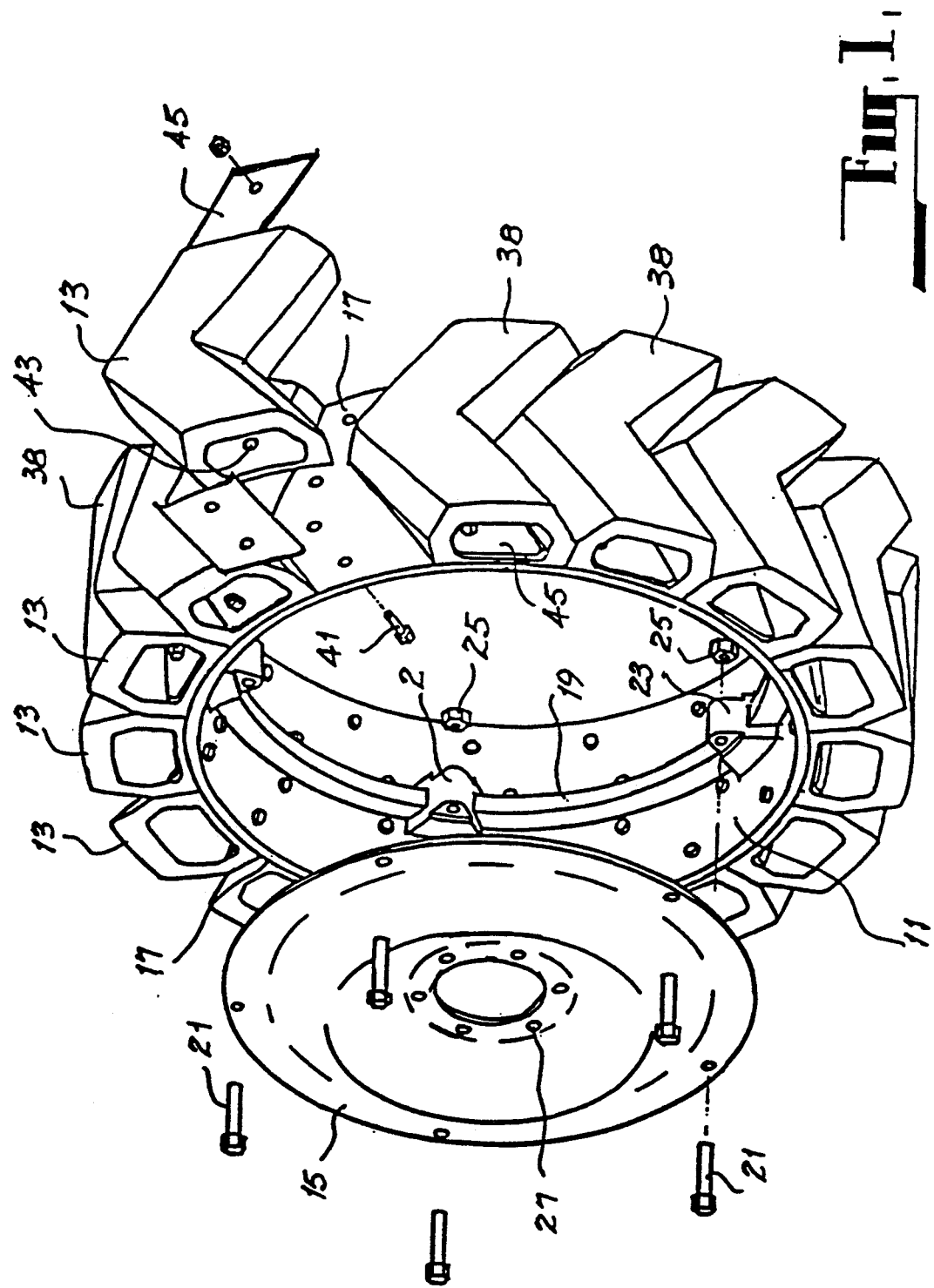
FIG. 1 is a perspective view (in partly exploded form) of a wheel according to a first embodiment.
Figure 2:
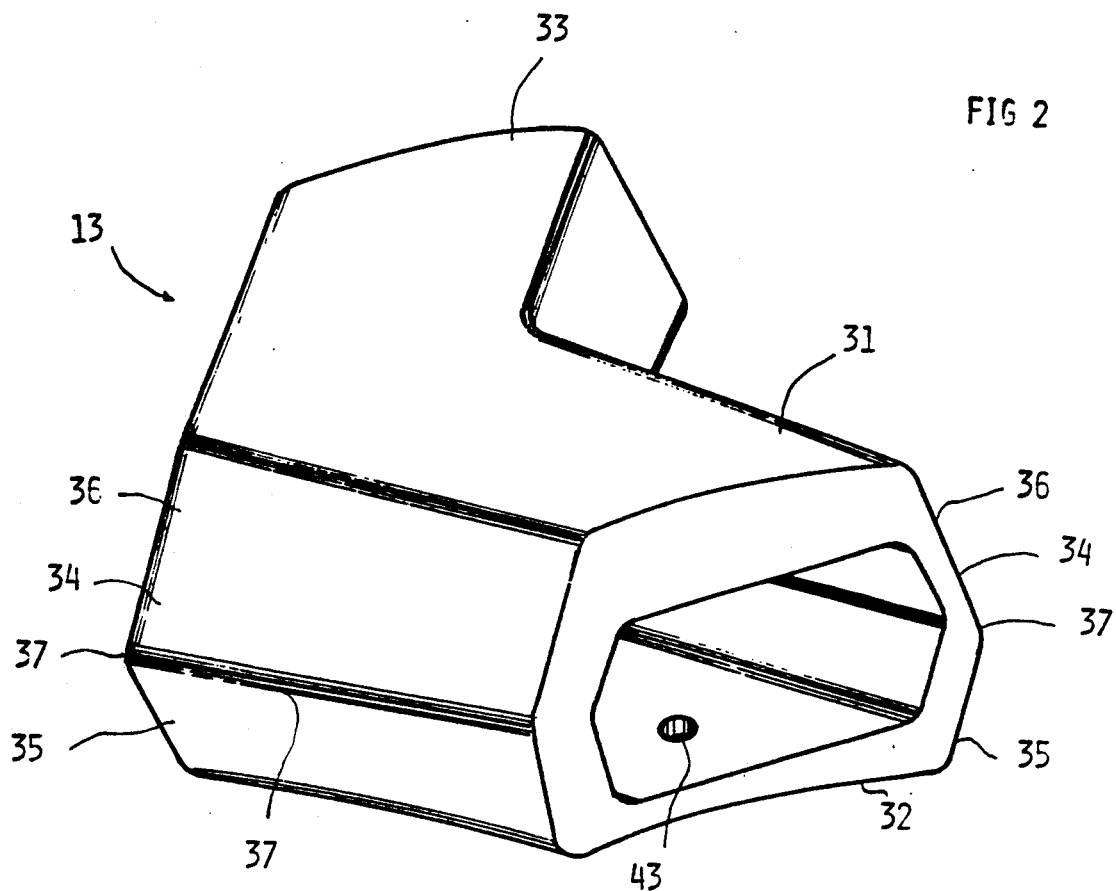
FIG. 2 is a perspective view of a ground engaging element which forms part of the wheel of FIG. 1.
Figure 3:
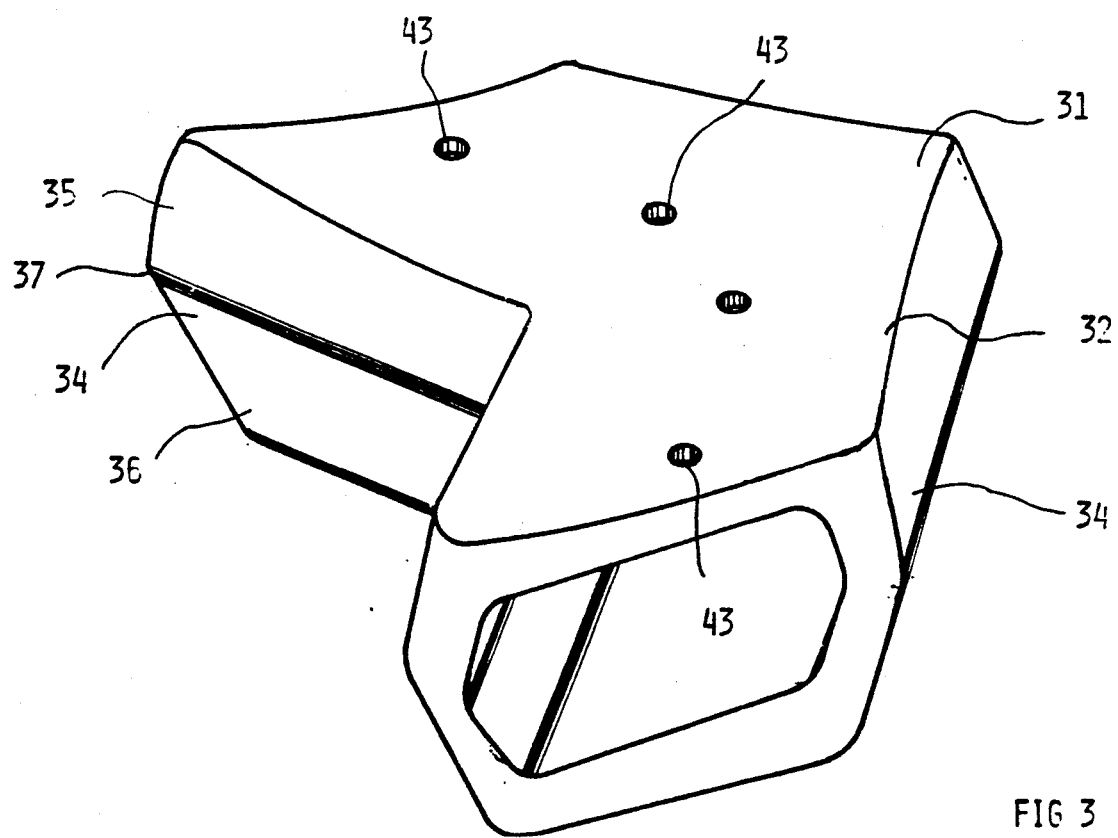
FIG. 3 is a perspective view of the underside of the ground engaging element of FIG. 2.

The first embodiment which is shown in FIGS. 1, 2 and 3 of the drawings is directed to a wheel for use on a four-wheel drive vehicle having military applications.

The wheel comprises a rim 11 having a plurality of ground engaging elements 13 mounted on the periphery of the rim. The elements 13 are formed from reinforced, resilient polymeric material such as rubber. The rim 11 includes a hub 15 adapted for mounting onto an axle of a vehicle in conventional manner and a rigid peripheral band 17 surrounding the hub to provide a base onto which the ground engaging elements 13 can be mounted. A mounting ring 19 is provided within the band 17 and is fixed to the band. The hub 15 is releasably attached to the mounting band 19 by way of bolts 21 which can be received in mounting lugs 23 provided on the mounting ring 21 and secured in place by way of nuts 25. With this arrangement, the hub 15 can be selected to ensure that the arrangement of mounting apertures 27 in the hub correspond to the arrangement of wheel mounting lugs on the axle of the vehicle to which the wheel is to be fitted.

Each ground engaging element 13 comprises a hollow body 3 which in this embodiment is tubular and open at its ends.

The ground engaging elements extend transversely of the direction of travel of the wheel and are configured into a V formation so as to create a chevron pattern when mounted on the wheel, as best shown in FIG. 1 of the drawings.

The hollow body 31 of each ground engaging element comprises an inner longitudinal face 32 for engagement against the rigid band 17 of the wheel rim, an outer longitudinal face 33 for contacting the ground, and two longitudinal side faces 34 between the inner and outer faces. Each longitudinal side face 34 is of angular construction and comprises inner and outer longitudinal portions 35 and 36 respectively. The inner and outer longitudinal portions 35 and 36 are formed integrally with each other and meet at a longitudinal junction 37 about which the portions 35 and 36 can flex.

The arrangement of the inner longitudinal portions 35 of the side faces is such that when the ground engaging elements are mounted onto the rim, the inner longitudinal portions of neighboring ground engaging elements are contiguous. In this way, the inner portions mutually support each other when deflecting under load.

The outer longitudinal portions 36 of each ground engaging element are inclined inwardly to provide a lug formation 38 at the outer region of the ground engaging element to facilitate traction in soft ground conditions.

Although not shown in the drawings, the outer face 33 of the ground engaging element is provided with a tread formation.

The ground engaging elements 13 are removably mounted onto the rim 11 by way of fixing bolts 41 which extend through apertures 43 in the band 17 and corresponding apertures 45 formed in the tubular body 13 to engage with a clamping plate 45 received within the hollow body 13. With this arrangement, the innermost part of the body is clamped between the clamping plate and the band 17 to secure the body in position on the rim. The clamping plate is of a V formation to conform to the shape of the hollow body.

When the ground engaging elements are mounted onto the rim, they provide a ground contacting surface for the wheel which can resiliently flex so as to offer some resistance to shock and which is not pneumatic in nature so as not to be susceptible to puncturing. Additionally, the lugs provided by the ground engaging elements facilitate traction in soft ground conditions.

Figure 4:
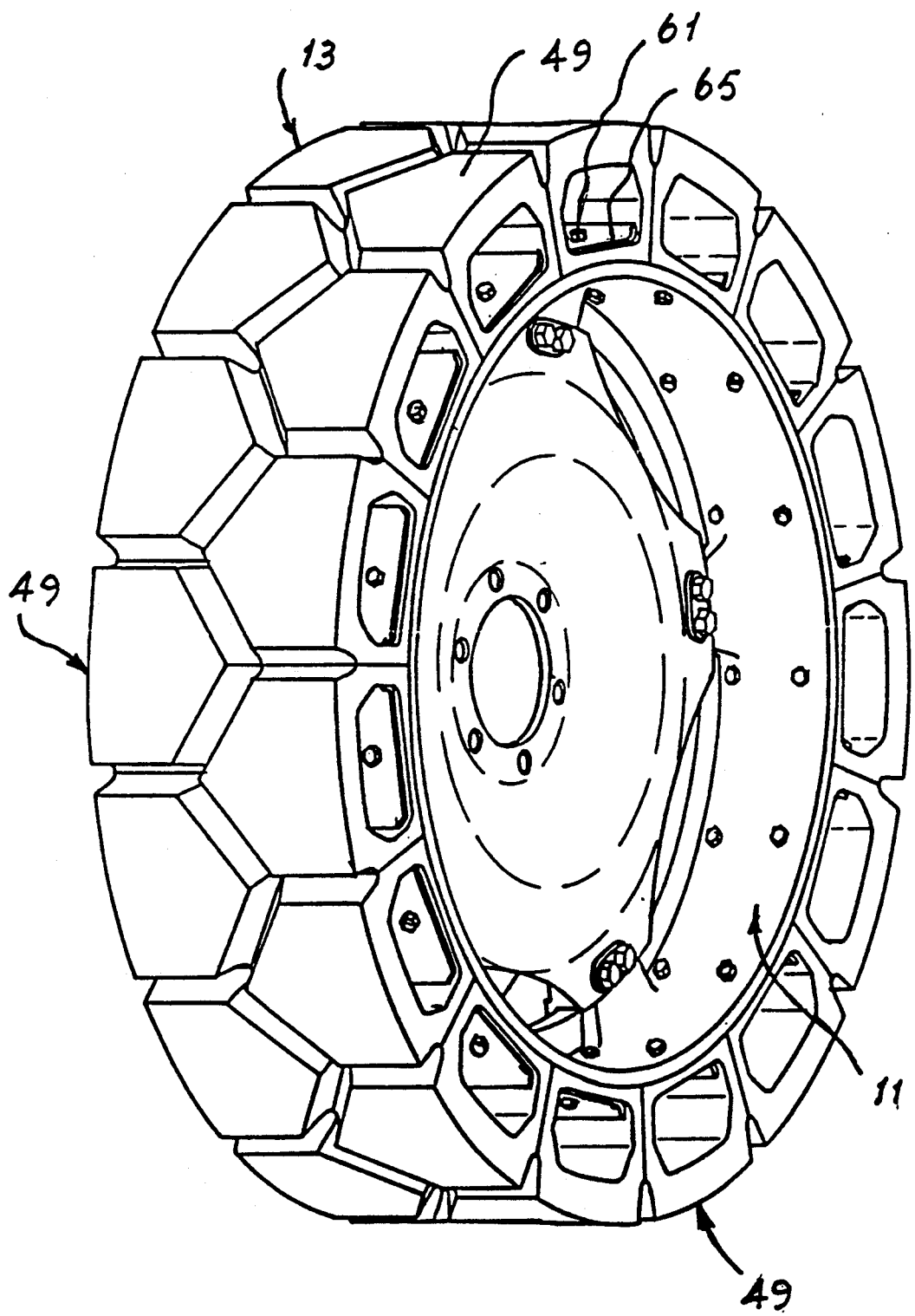
FIG. 4 is a perspective view of a wheel according to a second embodiment.
Figure 5:
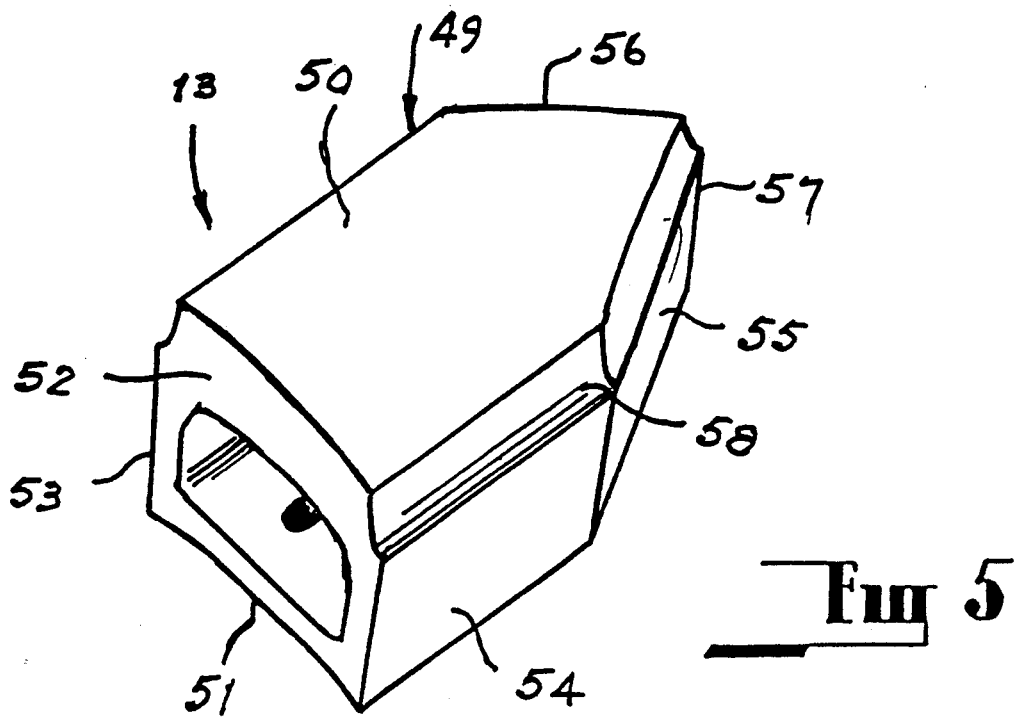
FIG. 5 is a perspective view of a ground engaging element which forms part of the wheel of FIG. 4.
Figure 6:
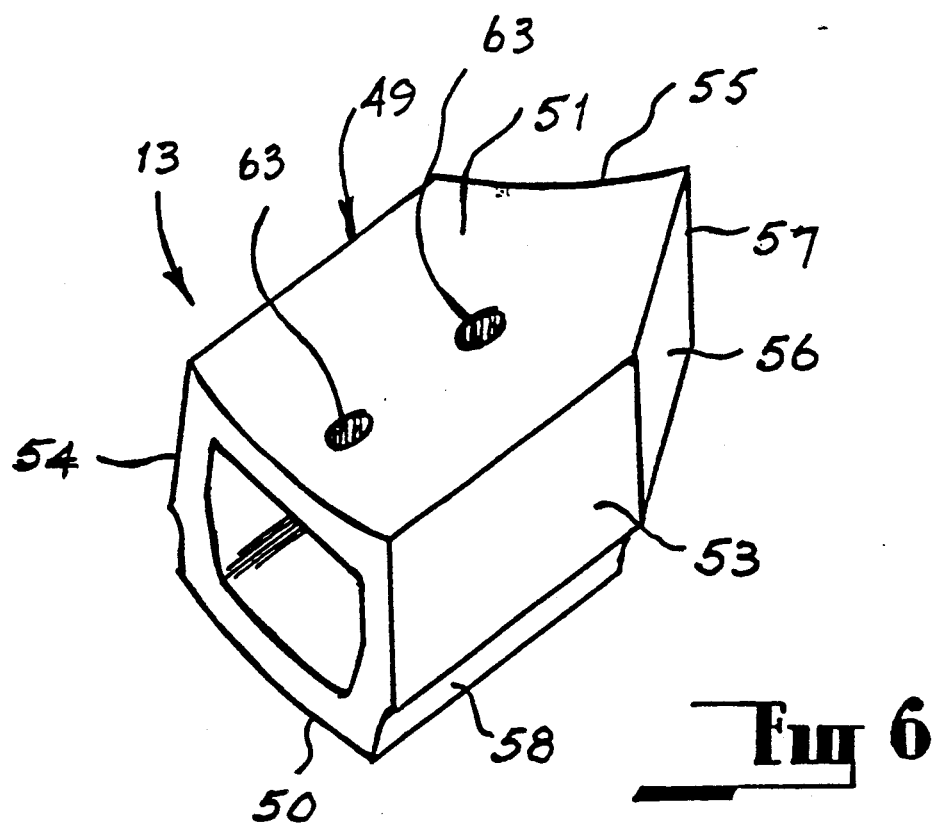
FIG. 6 is a perspective view of the underside of a ground engaging element of FIG. 5.

The second embodiment is shown in FIGS. 4, 5 and 6 and also is in the form of a wheel comprising a rim 11 having a plurality of ground engaging elements 13 mounted thereon.

Each ground engaging element 13 comprises a hollow body 49 having an outer longitudinal face 50 adapted for engagement against the ground and an inner longitudinal face 51 adapted for engagement with the base of the wheel. The outer longitudinal face and inner longitudinal face are substantially parallel with respect to each other and are spaced from each other by side faces which in the embodiment are integral with the outer and inner faces and which are arranged in a pentagonal configuration. Such side faces comprise a first face 52, second and third faces 53, 54 extending vertically and in the same direction from opposite ends of the first face, and fourth and fifth faces 55 and 56 extending from the end of the second and third faces respectively said fourth and fifth faces converging to form an apex portion 57.

The first face 52 is provided with the opening to allow access to the hollow body of each ground engaging element.

The second, third, fourth and fifth faces each comprise inner and outer portions, the latter being defined by a groove or chamfer 58.

Each ground engaging element 13 is sized such that when first face 52 is adjacent the edge of the base of the wheel, the apex portion 57 of each ground engaging element extends to a position approximately midway across the base of the wheel.

The assembled wheel comprises a first set of ground engaging elements positioned around the periphery of the wheel rim 11 with the first face 52 of each ground engaging element is positioned adjacent to one edge of the rim, and the inner portions of the second and third side faces in abutting relationship with corresponding parts of neighboring elements.

A second set of ground engaging elements are provided on the periphery of the wheel rim 11 with the first face 52 of each ground engaging element positioned adjacent to the other edge of the rim. The first set and second set of ground engaging elements are in an offset and opposed relationship to each other such that the inner portions of the fourth and fifth faces 55, 56 of one set of ground engaging elements are in abutment with the corresponding parts of two adjacent and opposed ground engaging elements of the other set.

The grooves or chamfers 58 on the ground engaging element co-operate to provide a tread pattern to facilitate gripping with the ground.

The arrangement of the lower portions of the side faces of the ground engaging elements being in abutment results in the side faces mutually supporting each other when deflecting under normal load conditions.

Although not shown in the drawings, the outer longitudinal face of each ground engaging element can be provided with a tread formation or any other form of formation to increase grip with the ground.

The ground engaging elements, are removably mounted onto the rim 11 by way of fixing bolts 61 which extend through apertures in rim and corresponding apertures 63 formed in the inner longitudinal face 51 to engage with a clamping plate 65 received within the hollow body of each ground engaging element. With this arrangement, the inner most part of the body is clamped between the clamping plate and rim to secure the body in position on the rim. The clamping plate preferably of a configuration to conform with the shape of the interior of the hollow body. When the ground engaging elements are assembled and mounted onto the rim they provide a ground contacting surface for the wheel which can resiliently flex so as to offer some resistance to shock and which is not pneumatic in nature and thus not susceptible to puncturing. Additionally should one ground engaging element be totally ruptured, the remaining ground engaging elements will provide sufficient support to allow the vehicle to continue its journey.

It should be appreciated that the scope of the invention is not limited to the scope of the two embodiments described. In particular, it should be appreciated that the invention may be applied to endless tracks for tracked vehicles in which case the ground engaging elements would be mounted onto a flexible band which passes around end rollers of the track.

The claims defining the invention are as follows:

1. A ground engaging means for a vehicle comprising a base and a plurality of ground engaging elements mounted on said base, each of said ground engaging elements comprising a hollow body having an inner face in engagement against said base, an outer face for contacting the ground, and side faces extending between the inner and outer faces, said side faces being constructed to be resiliently flexible thereby to deflect under normal load conditions, said ground engaging elements being so positioned on the base that adjacent side faces of neighboring elements provide lateral support for each other when deflecting under load, wherein at least some of said side faces of said ground engaging element are of angular construction comprising an inner portion and an outer portion which are integral with each other said inner portion extending from said inner face, said outer portion extending from said outer face and which meet at an angle along a junction.

2. A ground engaging means as claimed in claim 1 wherein neighboring ground engaging elements are positioned with said adjacent side faces in an abutting relationship.

3. A ground engaging means as claimed in claim 1 wherein said ground engaging elements are individually and removably mounted on said base.

4. A ground engaging means as claimed in claim 1 wherein said inner portions of adjacent side faces of neighboring elements abut each other providing said lateral support.

5. A ground engaging means as claimed in claim 1 wherein said outer portions of said side faces of each element are inclined inwardly to provide a lug at the outer region of said ground engaging element.

6. A ground engaging means as claimed in claim 1 wherein said ground engaging elements are elongated, each of said grounding engaging elements having two elongated side faces.

7. A ground engaging means as claimed in claim 6 wherein each of said ground engaging elements extends transversely to the direction of travel of said ground engaging means.

8. A ground engaging means as claimed in claim 7 wherein each of said ground engaging elements is configured into a V formation so that said ground engaging elements create a chevron pattern when mounted on said base.

9. A ground engaging means as claimed in claim 6 wherein said hollow body is tubular and open to the atmosphere at the ends of said hollow body.

10. A ground engaging means for a vehicle comprising a base and a plurality of ground engaging elements individually mountable to said base, each of said ground engaging elements comprising a hollow body and having an inner face for engagement against said base, an outer face for engagement with the ground, and wherein said ground engaging elements further comprise a first side face, a second side face and a third side face, said second and third side faces extending in the same direction from opposite sides of said first side face, and fourth and fifth side faces extending from the sides of said second and third side faces, respectively, remote from said first side face, said fourth and fifth side faces converging to an apex portion, and said side faces extending between said inner face and said outer face, said side faces being constructed to be resiliently flexible for deflection under normal load conditions, said ground engaging elements being configured and positioned on said base such that said side faces of each ground engaging element provide lateral support to said side faces of at least four adjacent ground engaging elements, and wherein said first face of each ground engaging element is disposed adjacent a peripheral edge of said base and said apex portion is positioned approximately centrally on said base, said second and third faces of each ground engaging element being adjacent to corresponding faces of adjacent ground engaging elements and said fourth and fifth faces of each ground engaging elements being adjacent to corresponding faces of oppositely disposed ground engaging elements.

11. A ground engaging means as claimed in claim 10 wherein at least some of the side faces of the ground engaging elements are provided with chamfers or grooves whereby upon assembly of said ground engaging elements on said base, said chamfers or grooves define a tread pattern.

12. A ground engaging means as claimed in claim 10 wherein the interior of said hollow body is open to the atmosphere through said first face.

13. A ground engaging means for a vehicle comprising a base, a plurality of individually removable ground engaging elements mounted on said base and attachment means maintaining said plurality of ground engaging elements in a fixed position with respect to said base, each of said ground engaging element comprising a resilient, hollow body having an inner face in contact with said base, an outer face for engaging the ground, side walls extending between said inner face and said outer face and wherein the hollow interior of said hollow body is open to the atmosphere, said ground engaging elements being configured, dimensioned and positioned on said base to result in the provision of lateral support between adjacent sides of neighboring ground engaging elements when one or both of said ground engaging elements is under load, and wherein said side walls comprise two portions, an inner portion extending from said inner face and an outer portion extending from said outer face, said inner portion and said outer portion being integral and said inner portion and said outer portion meeting at an angle at a juncture between said inner face and said outer face which juncture extends across said sidewalls generally parallel to said inner and outer faces.

14. A ground engaging means as claimed in claim 13 wherein the inner portions of said side walls of said ground engaging elements abut the adjacent inner portions of said side walls of neighboring ground engaging elements while said outer portions are angled away from the adjacent outer portions of neighboring ground engaging elements.

15. A ground engaging means as claimed in claim 14 wherein said base is a wheel comprising a rigid peripheral band, an interior mounting band affixed within said rigid peripheral band and coaxial with said peripheral band and a removable hub adapted for mounting said ground engaging means onto an axle of a vehicle in a conventional manner.

16. A ground engaging means as claimed in claim 15 wherein said ground engaging elements are tubular and chevron shaped and said ground engaging elements are mounted on said base abutting each of two neighboring ground engaging elements.

17. A ground engaging means as claimed in claim 15 wherein said ground engaging elements comprise four side walls and an open side face and said ground engaging elements are mounted on said base with the four side walls abutting four neighboring ground engaging elements.

18. A ground engaging means as claimed in claim 13 wherein said hollow body further comprises an interior surface defining said hollow interior and an exterior surface comprising said outer face, said inner face and the surfaces of said side walls extending between said inner face and said outer face, wherein the volume bounded between said interior surface and said exterior surface is less than the volume of said hollow interior.

* * * * *